(12) United States Patent
Gurao et al.

(10) Patent No.: US 9,347,322 B2
(45) Date of Patent: May 24, 2016

(54) GAS TURBINE INCLUDING BELLY BAND SEAL ANTI-ROTATION DEVICE

(71) Applicant: Siemens Akiengesellschaft, München (DE)

(72) Inventors: Manish S. Gurao, Oviedo, FL (US); Kevin M. Light, Maitland, FL (US); Paul A. Uhran, Palm Bay, FL (US); Matthew J. LaGrow, Winter Garden, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 807 days.

(21) Appl. No.: 13/665,992

(22) Filed: Nov. 1, 2012

(65) Prior Publication Data

US 2014/0119900 A1    May 1, 2014

(51) Int. Cl.
*F01D 11/00* (2006.01)
*F01D 5/06* (2006.01)

(52) U.S. Cl.
CPC *F01D 5/06* (2013.01); *F01D 5/066* (2013.01); *F01D 11/005* (2013.01); *F05D 2240/55* (2013.01)

(58) Field of Classification Search
CPC ........... F01D 5/06; F01D 5/063; F01D 5/066; F01D 5/02

USPC ......................................... 277/416, 421, 630
See application file for complete search history.

(56) References Cited

U.S. PATENT DOCUMENTS

| 5,320,488 | A | 6/1994 | Meade et al. |
| 5,865,600 | A | 2/1999 | Mori et al. |
| 5,967,746 | A | 10/1999 | Hagi et al. |
| 6,089,827 | A | 7/2000 | Ichiryu et al. |
| 6,315,301 | B1 | 11/2001 | Umemura et al. |
| 7,470,113 | B2 | 12/2008 | Tran et al. |
| 7,549,845 | B2 | 6/2009 | Uwami et al. |
| 7,581,931 | B2 | 9/2009 | Shaefer et al. |
| 2009/0148279 | A1 | 6/2009 | Shaefer et al. |
| 2009/0191050 | A1 | 7/2009 | Nereim et al. |
| 2010/0074731 | A1 | 3/2010 | Wiebe et al. |

FOREIGN PATENT DOCUMENTS

| CN | 1475656 A | 2/2004 |
| CN | 1556893 A | 12/2004 |
| JP | 39133005 A | 5/1997 |

*Primary Examiner* — Craig Kim
*Assistant Examiner* — Michael Sehn

(57) ABSTRACT

A sealing band located in opposing seal band receiving slots of adjacent turbine disks to seal an annular gap therebetween. An anti-rotation body including a base portion is located between edges of the sealing band within the annular gap, and a pin portion extends axially from the base portion for engagement with a cut-out portion of at least one of the disks. A pair of spaced projections extend from the base portion and into through openings in the sealing band at a location within the annular gap. The projections define an attachment structure attaching the anti-rotation body to the sealing band.

16 Claims, 2 Drawing Sheets

GAS TURBINE INCLUDING BELLY BAND SEAL ANTI-ROTATION DEVICE

FIELD OF THE INVENTION

This invention relates in general to seals for multistage turbomachines and, more particularly, to an anti-rotation structure for a seal provided between adjoining disks in a multistage turbomachine.

BACKGROUND OF THE INVENTION

In various multistage turbomachines used for energy conversion, such as turbines, a fluid is used to produce rotational motion. In a gas turbine, for example, a gas is compressed through successive stages in a compressor and mixed with fuel in a combustor. The combination of gas and fuel is then ignited for generating combustion gases that are directed to turbine stages to produce the rotational motion. The turbine stages and compressor stages typically have stationary or non-rotary components, e.g., vane structures, that cooperate with rotatable components, e.g., rotor blades, for compressing and expanding the operational gases.

The rotor blades are typically mounted to disks that are supported for rotation on a rotor shaft. Annular arms extend from opposed portions of adjoining disks to define paired annular arms. A cooling air cavity is formed on an inner side of the paired annular arms between the disks of mutually adjacent stages, and a labyrinth seal may be provided on the inner circumferential surface of the stationary vane structures for cooperating with the annular arms to effect a gas seal between a path for the hot combustion gases and the cooling air cavity. The paired annular arms extending from opposed portions of adjoining disks define opposing end faces located in spaced relation to each other. Typically the opposing end faces may be provided with a slot for receiving a seal strip, known as a "belly band seal", which bridges the gap between the end faces to prevent cooling air flowing through the cooling air cavity from leaking into the path for the hot combustion gases. The seal strip may be formed of multiple segments, in the circumferential direction, that are interconnected at lapped or stepped ends.

When the seal strip comprises plural segments positioned adjacent to each other, in the circumferential direction, the seal strips may shift circumferentially relative to each other. Shifting may cause one end of a seal strip segment to increase the overlap with an adjacent segment, while the opposite end of the seal strip segment will move out of engagement with an adjacent segment, opening a gap for passage of gases through the seal strip. Hence, it is typically desirable to provide a mechanism for preventing relative circumferential shifting of the seal strip segments.

SUMMARY OF THE INVENTION

In accordance with an aspect of the invention, a turbine is provided comprising a plurality of stages, each stage comprising a rotatable disk and blades carried thereby, at least one pair of adjacent rotatable disks defining an annular gap therebetween and having respective opposing sealing band receiving slots aligned with the annular gap. A sealing band is located in the opposing seal band receiving slots to seal the annular gap and includes opposing sealing band edges. At least one through opening is formed in the sealing band between the opposing sealing band edges. An anti-rotation body including a base portion is located between the sealing band edges within the annular gap, and a pin portion extends axially from the base portion for engagement with a cut-out portion of at least one of the disks. A projection extends from the base portion and through the at least one through opening in the sealing band at a location within the annular gap. The projection defines an attachment structure attaching the anti-rotation body to the sealing band.

The projection may be formed integrally with the base portion. The attachment structure may comprise a welded joint between the projection and the sealing band.

The through opening may be located generally midway between the sealing band edges.

The anti-rotation body may be located on a radially inner side of the sealing band, and the base portion may include a radially outwardly facing side engaged against an inwardly facing surface of the sealing band.

The base portion may have an elongated dimension located along a length of the sealing band, and at least two projections may be spaced along the elongated dimension and extend radially through corresponding through openings in the sealing band, each of the projections being attached to the sealing band by a welded joint. The pin portion may extend from the base portion at a location generally midway between the projections.

A threaded hole may be formed in the base portion between the projections, and the threaded hole may receive a threaded shaft extending through the sealing band for retaining the anti-rotation body in engagement with the sealing band during an attachment operation attaching the projections to the sealing band.

In accordance with another aspect of the invention, a turbine is provided comprising a plurality of stages, each stage comprising a rotatable disk and blades carried thereby, at least one pair of adjacent rotatable disks defining an annular gap therebetween and having respective opposing sealing band receiving slots aligned with the annular gap. A sealing band is located in the opposing seal band receiving slots to seal the annular gap and including opposing sealing band edges. An anti-rotation body including a base portion is located between the sealing band edges within the annular gap and includes a radially outwardly facing side engaged against an inwardly facing surface of the sealing band, and a pin portion extends axially from the base portion for engagement with a cut-out portion of at least one of the disks. A pair of spaced projections extend from the base portion and into through openings in the sealing band at a location within the annular gap. The projections define an attachment structure attaching the anti-rotation body to the sealing band.

The projections may be formed integrally with the base portion. The attachment structure may comprise welded joints between the projections and the sealing band. The welded joints may be formed at a radially outwardly facing surface of the sealing band and are formed in the annular gap between the disks.

The through openings may be located generally midway between the sealing band edges.

The base portion may have an elongated dimension located along a length of the sealing band, and the two projections are located spaced along the elongated dimension. The pin portion may extend from the base portion at a location generally midway between the projections to form a generally T-shaped component.

An aperture may be formed in the sealing band between the openings receiving the projections, and a hole may be formed in the base portion and aligned with the hole in the sealing band for receiving a retention structure for retaining the anti-rotation body in engagement with the sealing band during an attachment operation attaching the anti-rotation body to the sealing band. The hole formed in the base portion may be a threaded hole, and the retention structure may comprise a threaded shaft extending through the sealing band for engaging in the hole for retaining the anti-rotation body in engagement with the sealing band.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
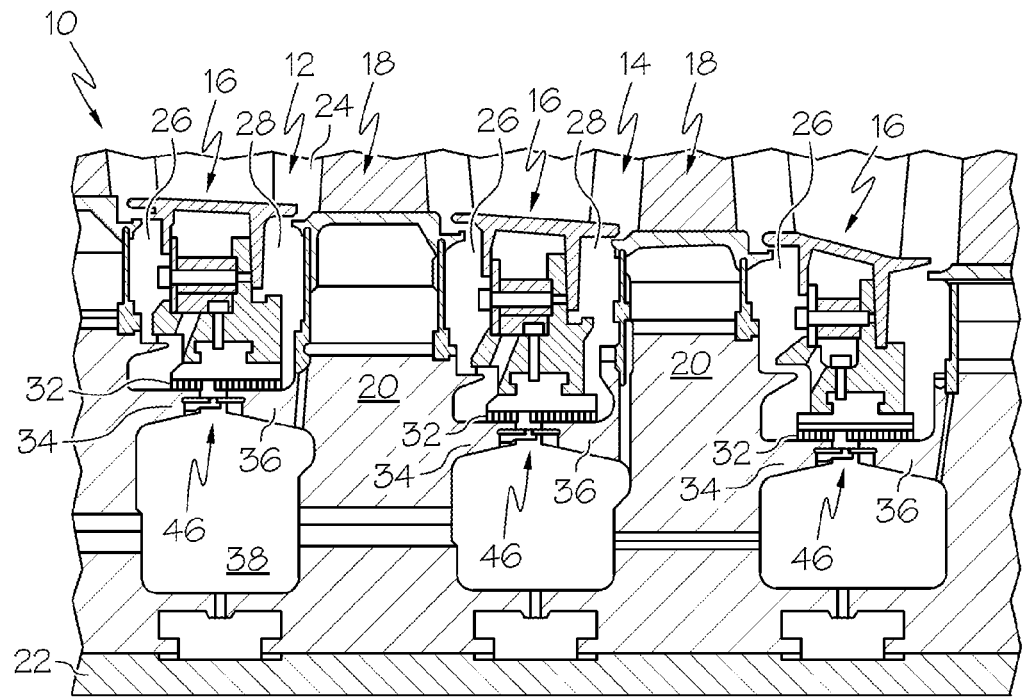
FIG. 1 is diagrammatic section view of a portion of a gas turbine engine including an anti-rotation structure in accordance with the present invention.

Referring to FIG. 1, a portion of a turbine engine 10 is illustrated diagrammatically including adjoining stages 12, 14, each stage 12, 14 comprising an array of stationary vane assemblies 16 and an array of rotating blades 18, where the vane assemblies 16 and blades 18 are positioned circumferentially within the engine 10 with alternating arrays of vane assemblies 16 and blades 18 located in the axial direction of the turbine engine 10. The blades 18 are supported on rotor disks 20 secured to adjacent disks with spindle bolts 22. The vane assemblies 16 and blades 18 extend into an annular gas passage 24, and hot gases directed through the gas passage 24 flow past the vane assemblies 16 and blades 18 to remaining rotating elements.

Disk cavities 26, 28 are located radially inwardly from the gas passage 24. Purge air is preferably provided from cooling gas passing through internal passages in the vane assemblies 16 to the disk cavities 26, 28 to cool blades 18 and to provide a pressure to balance against the pressure of the hot gases in the gas passage 24. In addition, interstage seals comprising labyrinth seals 32 are supported at the radially inner side of the vane assemblies 16 and are engaged with surfaces defined on paired annular disk arms 34, 36 extending axially from opposed portions of adjoining disks 20. An annular cooling air cavity 38 is formed between the opposed portions of adjoining disks 20 on a radially inner side of the paired annular disk arms 34, 36. The annular cooling air cavity 38 receives cooling air passing through disk passages to cool the disks 20.

Figure 3:
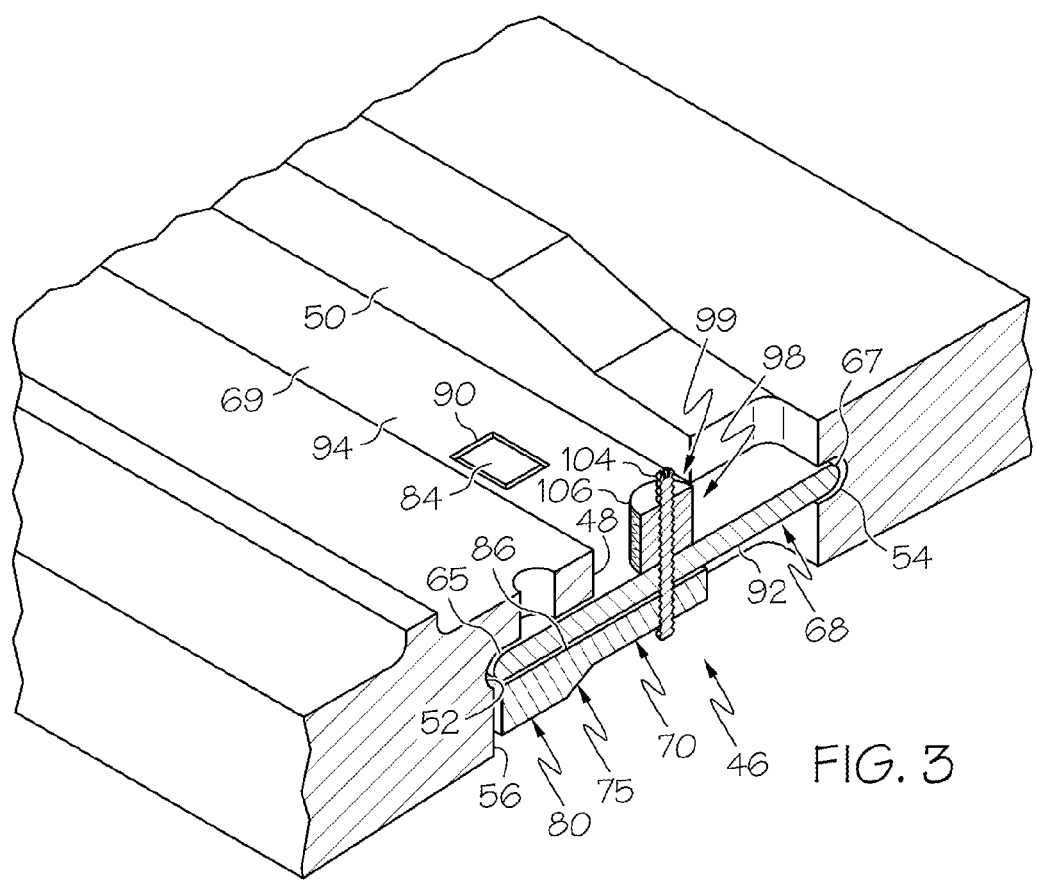
FIG. 3 is a perspective view of the anti-rotation structure assembled to the sealing band and shown in relation to a section of a pair adjoining rotatable disks.
Figure 4:
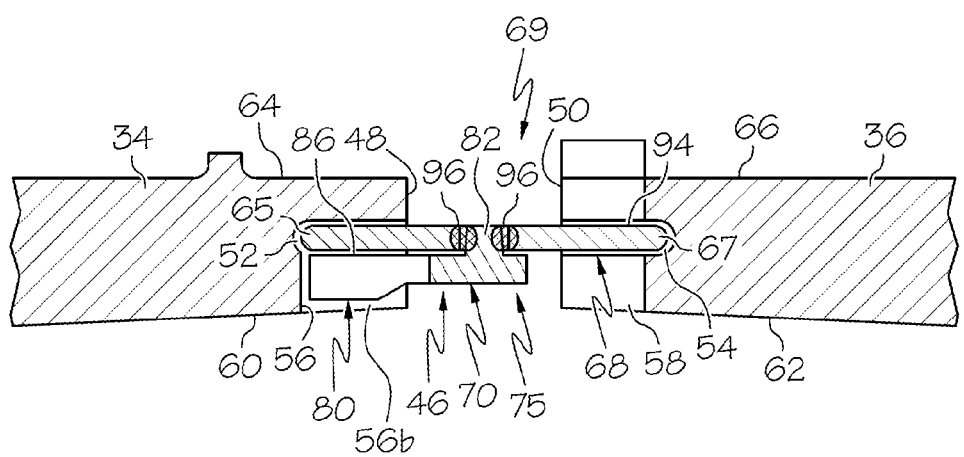
FIG. 4 is a cross-sectional view of the anti-rotation assembly including an anti-rotation body assembled to the sealing band by a welding attachment operation.

Referring further to FIG. 4, the disk arms of two adjoining disks 20 are illustrated for the purpose of describing the seal strip assembly 46 of the present invention, it being understood that the disks 20 and associated disk arms 34, 36 define an annular structure extending the full circumference about the rotor centerline. The disk arms 34, 36 define respective opposed end faces 48, 50 located in closely spaced relation to each other. A circumferentially extending slot 52, 54 (see also FIG. 3) is formed in the respective end faces 48, 50, wherein the slots 52, 54 are radially aligned with an annular gap 69 defined between the end faces 48, 50. In addition, the disk arms 34, 36 typically include at least one cut-out portion or radial opening 56, 58 extending from a radially inner surface 60, 62 toward a radially outer surface 64, 66 of respective disk arms 34, 36, and extending axially inwardly from the end faces 48, 50 and intersecting the slots 52, 54. The radial openings 56, 58 may extend a partial distance toward the outer surfaces 64, 66, as is illustrated by the opening 56, or may extend the entire distance through the disk arm 34, 36, as is illustrated by the opening 58 extending through the disk arm 36 from the inner surface 62 to the outer surface 66.

Figure 2:
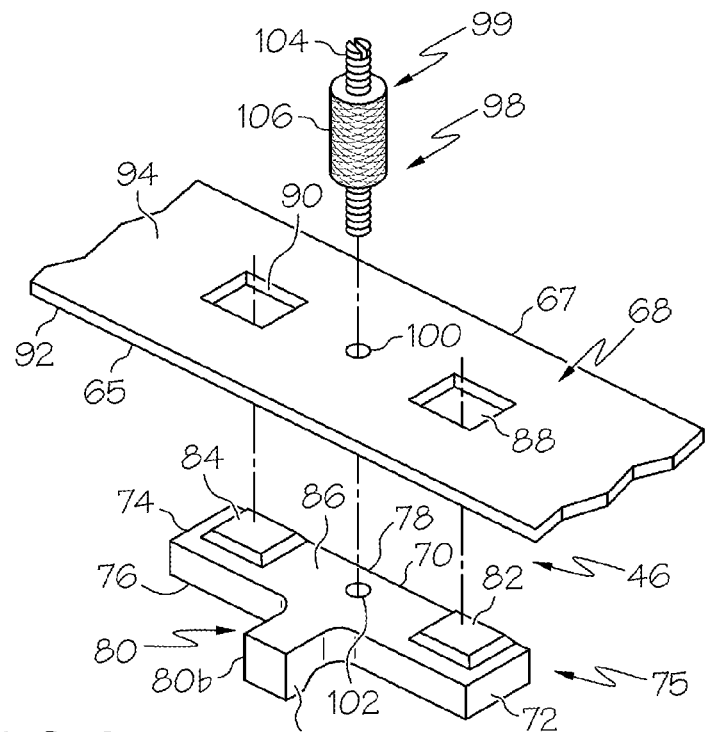
FIG. 2 is an exploded perspective view illustrating the anti-rotation structure in association with a sealing band in accordance with an aspect of the present invention.

Referring to FIG. 2, the seal strip assembly 46 includes a sealing band 68 forming a circumferentially extending belly band seal. The sealing band 68 includes opposing sealing band edges 65, 67 which are positioned within the respective slots 52, 54 (FIGS. 3 and 4) defined in the opposed end faces 48, 50. The sealing band 68 spans the annular gap 69 between the end faces 48, 50 and defines a seal for preventing or substantially limiting flow of gases between the cooling air cavity 38 and the disk cavities 26, 28.

It may be noted that the radial openings 56, 58 in the disk arms 34, 36 are typically provided for engagement with a prior art anti-rotation structure (not shown) associated with a belly band seal. For example, a known anti-rotation structure could be a block structure attached to the belly band seal and extending axially into the openings 56, 58, where engagement between the anti-rotation structure and sides of the openings 56, 58 prevents or limits circumferential movement of the belly band seal or segments of the seal. Such an anti-rotation structure is illustrated in U.S. Pat. No. 7,581,931, which patent is incorporated herein by reference. As is described below, the present invention provides an anti-rotation device capable of utilizing the existing disk arm structure, including utilizing one or more of the radial openings 56, 58 to prevent rotation of the sealing band 68.

Further, it should be noted that the sealing band 68 is a "wear" part that needs to be replaced after a certain period of turbine operation in order to maintain its sealing function. A procedure for replacing sealing bands has typically been performed during a rotor de-stack as an in-shop operation. In accordance with an aspect of the invention, the replacement of the sealing band 68 and installation of the anti-rotation structure described herein may be performed as an in-field operation.

Referring to FIG. 2, in accordance with an aspect of the invention, the seal strip assembly 46 further includes an anti-rotation body 75 including a base portion 70 having an elongated dimension extending between first and second ends 72, 74 in the circumferential direction. The body portion 70 of the anti-rotation body 75 has an axial dimension defined between opposed first and second axial edges 76, 78 that is less than the spacing between the opposed end faces 48, 50 of the disk arms 34, 36, and is dimensioned to fit entirely within the annular gap 69.

A pin portion 80 extends axially from the first axial edge 76 of the base portion 70, generally midway between the first and second ends 72, 74, and is dimensioned to extend axially into the radial opening 56 in the disk arm 34 (FIG. 4). The base portion 70 and the pin portion 80 are preferably formed integral with each other and define a T-shaped configuration for the anti-rotation body 75. It may be noted that the present T-shaped configuration provides for engagement within only one of the radial openings 56, 58 to resist rotation of the sealing band 68, and that this configuration provides a lower mass anti-rotation device than may be provided by a structure configured to engage both of the openings 56, 58.

A pair of radially extending members comprising first and second projections 82, 84 extend from a radially outwardly facing side 86 of the base portion 70 of the anti-rotation rotation body 75. The projections 82, 84 are preferably formed integrally with the body portion 70 and are adapted to extend into through openings 88, 90 formed in the sealing band 68 located generally midway between the edges 65, 67 of the sealing band 68. Preferably, the projections 82, 84 have a radially extending dimension, i.e., in a direction perpendicular to the radially outwardly facing side 86, that is greater than the thickness of the sealing band 68.

Referring to FIG. 3, in an assembly and attachment operation the anti-rotation body 75, after the sealing band 68 is located within the disk arm slots 52, 54, the anti-rotation body 75 is moved toward the sealing band 75 to position the outwardly facing side 86 to an engagement position in contact with a radially inner surface 92 of the sealing band 75. In the engagement position, outer ends of the projections 82, 84 (only one projection shown in FIG. 3) extend outwardly beyond a radially outer surface 94 of the sealing band 68. The projections 82, 84 define an attachment structure for cooperating with the sealing band 68 to retain the anti-rotation body 75 on the sealing band 68 with the pin portion 80 engaged within the radial opening 56. In accordance with one embodiment of the invention, the projections 82, 84 may be affixed to the sealing band 68 by a weld connection, as is illustrated in FIG. 4 by a cross-sectional view through the projection 82, welded in place on the sealing band 68, and showing one or more weld joints 96 joining the projection 82 to the sealing band.

Referring to FIG. 3, in accordance with an aspect of the invention, a temporary retention structure 98 may be provided for retaining the anti-rotation body 75 in position of the sealing band 68 during a welding operation. The sealing band may be formed with an aperture 100 (FIG. 2) located between the openings 88, 90, and the base portion 70 is formed with a corresponding threaded hole 102 that is aligned with the aperture 100 in the sealing band 68. The retention structure 98 additionally includes a tool 99 comprising a threaded shaft 104 having a cylindrical threaded nut 106 supported thereon. The threaded nut 106 may have a knurled exterior surface to facilitate a user grasping the nut 106 to rotate the threaded shaft 104. The threaded shaft 104 is sized to pass through the aperture 100 and threadably engage with the hole 102, with the nut 106 positioned against the outer surface 94 of the sealing band 68 to retain the anti-rotation body 75 in engagement with the inner surface 92 of the sealing band 68 during a welding operation. It is believed that, by positively clamping the anti-rotation body 75 immovably in position in engagement with the sealing band 68 during the welding operation, the temporary retention structure 98 provides a significantly improved weld quality at the projections 82, 84. Subsequent to welding the projections 82, 84 to the sealing band, the threaded shaft 104 may be unthreaded from the hole 102 to remove the retention structure tool 99 from the seal strip assembly 46.

It should be noted that, although welding is one way to secure the anti-rotation body 75 to the sealing band 68, the anti-rotation body 75 can also be secured to the sealing band 68 by other means, such as by using one or more bolts or rivets.

With the anti-rotation body 75 attached to the sealing band 68, the pin portion 80 is located within the radial opening 56 wherein opposing circumferentially facing sides 80a, 80b of the pin portion 80 engage against respective opposing sides (only side 56b illustrated) of the radial opening 56 to prevent or limit circumferential movement of the sealing band 68. As noted above, the anti-rotation body 75 is adapted to be used in conjunction with an existing structure formed on the disk arms 34, 36, i.e., not requiring machining or other modification to the arms 34, 36. Hence, in accordance with an aspect of the invention, the present anti-rotation body 75 is a field replaceable device, such as may be installed during a routine or scheduled maintenance event for the turbine engine 10, and may be installed with replacement of an existing belly band seal.

Further, one advantage of the present anti-rotation device is the mounting of the anti-rotation body 75 wherein a weld connection is provided between the sealing band 68 and the projections 82, 84, without requiring separate fasteners, or other components located in an exposed area, i.e., at the outer surface 94 of the sealing band 68, that may become loose, or could possibly be impacted by objects that may become liberated from other components, e.g., loose objects from interstage seals. In particular, the radially outer sides of the projections 82, 84 are preferably generally flush with the outer surface 94 of the sealing band 68, thus ensuring that the welded area 96 does not protrude from the outer surface 94, preferably avoiding a feature that might be subject to impact from objects, i.e., loose objects moving across the outer surface 94. However, it should be understood that within the scope of certain aspects of the invention, the anti-rotation body 75 may be retained in position on the sealing band 68 by projections passing through the openings 88, 90 and engaged between the sealing band 68 and the base portion 70, and may comprise fasteners including, for example, rivets or screws.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine comprising:
   a plurality of stages, each stage comprising a rotatable disk and blades carried thereby, at least one pair of adjacent rotatable disks defining an annular gap therebetween and having re-pective opposing sealing band receiving slots aligned with the annular gap;
   a sealing band located in the opposing seal band receiving slots to seal the annular gap and including opposing sealing band edges;
   at least one through opening formed in said sealing band between said opposing sealing band edges;
   an anti-rotation body including a base portion located between said sealing band edges within said annular gap, and a pin portion extending axially from said base portion for engagement with a cut-out portion of at least one of said disks; and
   a projection extending from said base portion and through said at least one through opening in said sealing band at a location within said annular gap, said projection defining an attachment structure attaching said anti-rotation body to said sealing band, wherein said through opening is located generally midway between said sealing band edges.

2. The turbine of claim 1, wherein said projection is formed integrally with said base portion.

3. The turbine of claim 2, wherein said attachment structure includes a welded joint between said projection and said sealing band.

4. The turbine of claim 1, wherein said anti-rotation body is located on a radially inner side of said sealing band.

5. The turbine on claim 4, wherein said base portion includes a radially outwardly facing side engaged against an inwardly facing surface of said sealing band.

6. A turbine comprising:
a plurality of stages, each stage comprising a rotatable disk and blades carried thereby, at least one pair of adjacent rotatable disks defining an annular gap therebetween and having re-spective opposing sealing band receiving slots aligned with the annular gap;
a sealing band located in the opposing seal band receiving slots to seal the annular gap and including opposing sealing band edges;
at least one through opening formed in said sealing band between said opposing sealing band edges;
an anti-rotation body including a base portion located between said sealing band edges within said annular gap, and a pin portion extending axially from said base portion for engage-ment with a cut-out portion of at least one of said disks; and
a projection extending from said base portion and through said at least one through opening in said sealing band at a location within said annular gap, said projection defining an attach-ment structure attaching said anti-rotation body to said sealing band,
wherein said base portion has an elongated dimension located along a length of said sealing band, and at least two projections spaced along said elongated dimension and extending radially through corresponding through openings in said sealing band, each of said projections being attached to said sealing band by a welded joint, and
wherein said pin portion extends from said base portion at a location generally midway between said projections.

7. The turbine of claim 6, including a threaded hole formed in said base portion between said projections, said threaded hole receiving a threaded shaft extending through said sealing band for retaining said anti-rotation body in engagement with said sealing band during an attachment operation attaching said projections to said sealing band.

8. A turbine comprising:
a plurality of stages, each stage comprising a rotatable disk and blades carried thereby, at least one pair of adjacent rotatable disks defining an annular gap therebetween and having re-spective opposing sealing band receiving slots aligned with the annular gap;
a sealing band located in the opposing sealing band receiving slots to seal the annular gap and including opposing sealing band edges;
an anti-rotation body including a base portion located between said sealing band edges within said annular gap and including a radially outwardly facing side engaged against an in-wardly facing surface of said sealing band, and a pin portion extending axially from said base portion for engagement with a cut-out portion of at least one of said disks; and
a pair of circumferentially spaced projections extending from said base portion and into circumferentially spaced respective through openings in said sealing band at a location within said annular gap, said projections defining an attachment structure attaching said anti-rotation body to said sealing band.

9. The turbine of claim 8, wherein said projections are formed integrally with said base portion.

10. The turbine of claim 9, wherein said attachment structure includes welded joints between said projections and said sealing band.

11. The turbine of claim 10, wherein said welded joints are formed at a radially outwardly facing surface of said sealing band and are formed in said annular gap between said disks.

12. The turbine of claim 8, wherein said through openings are located generally midway between said sealing band edges.

13. The turbine of claim 8, wherein said base portion has an elongated dimension located along a length of said sealing band in a circumferential direction, and said two projections are located spaced along said elongated dimension.

14. The turbine of claim 8, wherein said pin portion extends from said base portion at a location generally midway between said projections to form a generally T-shaped component.

15. The turbine of claim 8, including an aperture formed in said sealing band between said openings receiving said projections, and a hole formed in said base portion and aligned with said hole in said sealing band for receiving a retention structure for retaining said anti-rotation body in engagement with said sealing band during an attachment operation attaching said projections to said sealing band.

16. The turbine of claim 15, wherein said hole formed in said base portion is a threaded hole, and said retention structure comprises a threaded shaft extending through said sealing band for engaging in said threaded hole for retaining said anti-rotation body in engagement with said sealing band.

* * * * *